March 31, 1959　　　A. Y. DODGE　　　2,879,869
ONE WAY CLUTCH AND BEARING
Filed Sept. 21, 1953
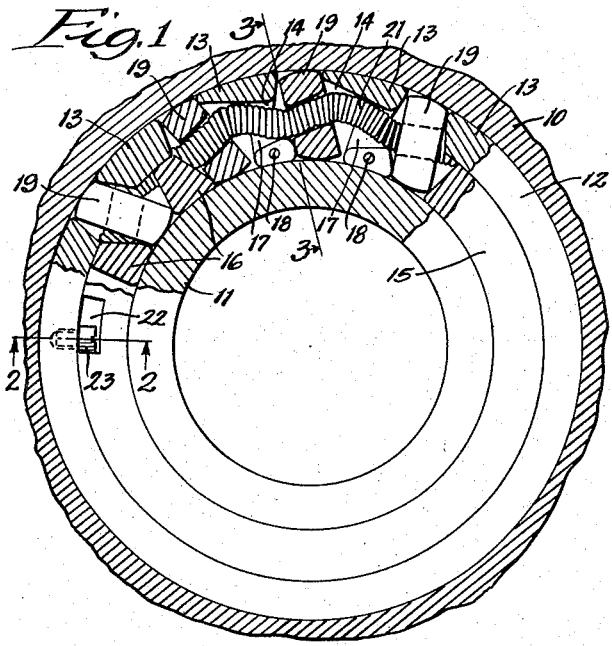
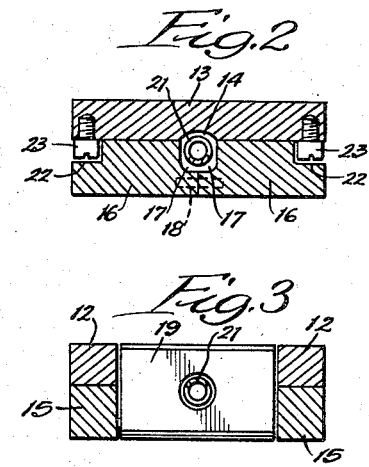
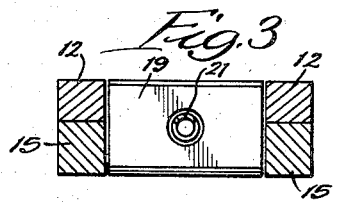
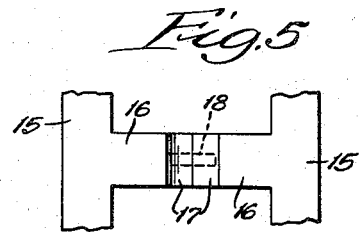
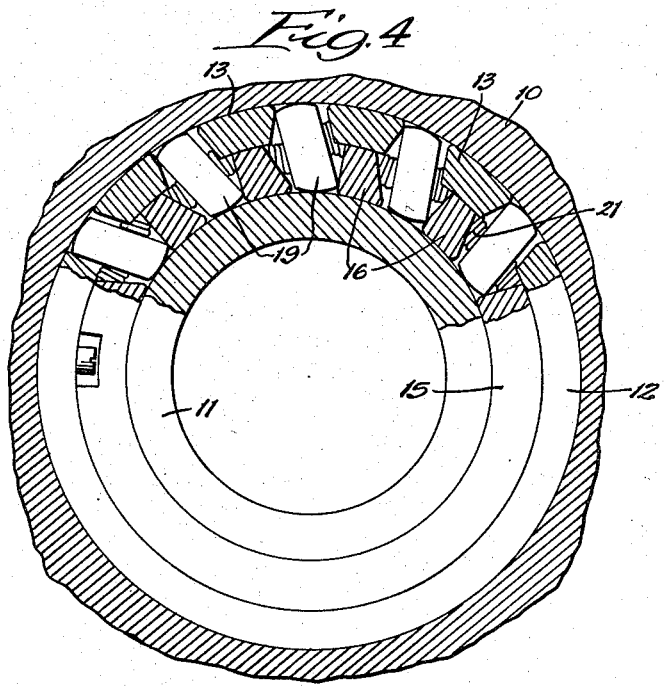
INVENTOR:
Adiel Y. Dodge,
BY
Bair, Freeman & Molinare
ATTORNEYS.

United States Patent Office 2,879,869
Patented Mar. 31, 1959

2,879,869

ONE WAY CLUTCH AND BEARING

Adiel Y. Dodge, Rockford, Ill., assignor to Borg-Warner Corporation, Chicago, Ill., a corporation of Illinois Application September 21, 1953, Serial No. 381,154

9 Claims. (Cl. 192—45.1)

This invention relates to a one way clutch and bearing and more particularly to a one way clutch in which the cage functions as a bearing between the races during relative rotations thereof.

One way clutches of the tilting gripper type have been used extensively and present many advantages over other known types of clutches. One of the problems in connection with the tilting gripper clutches has been control of tilting of the grippers, especially in installations subjected to vibrations or to extremely rapid torque reversals to insure that all of the grippers function substantially simultaneously and properly and to prevent tilting of any of the grippers to an excessive released position in which they may be inoperative.

There are many installations of tilting gripper type clutches in which it is highly desirable to have the clutch unit itself function also as a bearing. A number of proposals have been made for clutches and bearing combinations such as, for example, the use of a one piece cage functioning as a bearing, as disclosed in the patent to Dodge and Swenson No. 2,366,842 or the use of separate bearing elements in combination with the clutch grippers, as disclosed in Dodge Patent No. 2,383,595 or 2,408,962. So far as I am aware, however, no construction has heretofore been proposed which satisfactorily solves both the problem of adequately controlling tilting of the grippers under adverse conditions and providing a convenient bearing between the races.

It is one of the objects of the present invention to provide a one way clutch and bearing in which the cage is constructed to control tilting of the grippers and at the same time acts as a bearing between the races.

Another object is to provide a one way clutch and bearing in which the cage is formed by relatively movable inner and outer cage rings slidably engaging each other and the races to act as a bearing between the races and to control fully tilting of the grippers.

According to one feature of the invention, one of the cage rings is formed in two parts to facilitate assembly and the other cage ring carries projections extending loosely into notches in such parts to hold the parts against separation and to limit relative rotation of the cage ring.

The above and other objects and features of the invention will be more readily apparent from the following decription when read in connection with the accompanying drawing in which:

Figure 1 is an end view with parts in section of a one way clutch and bearing embodying the invention;

Figure 2 is a partial section on the line 2—2 of Figure 1;

Figure 3 is a section on the line 3—3 of Figure 1;

Figure 4 is similar to Figure 1 showing the parts in engaged position; and

Figure 5 is a partial plan view of the inner cage ring.

The clutch and bearing unit as shown is adapted to connect an outer race 10 formed with an inner cylindrical surface to an inner race 11 formed with an outer cylindrical surface co-axial with the inner surface of the race 10. The clutch assembly comprises a cage formed by an outer cage ring which may be integrally cast or otherwise formed with annular continuous end rings 12 connected by integral cross bars 13. The inner and outer surfaces of the outer cage ring have smooth cylindrical surfaces to fit slidably against the outer race 10 and to terminate in an inner cylindrical surface between the inner and outer races. The cross bars 13 are of the same thickness as the end ring 12 throughout the major portion of their length, but may be notched or cut out in their centers, as indicated at 14 to accommodate a spring, as described hereinafter.

The inner cage ring is formed in two identical parts each of which includes an annular end ring 15 with relatively short spaced cross members 16 extending therefrom. The cross members 16 are of such a length that they will abut end-to-end when the cage is assembled to space the end rings 15 the same distance apart as the end rings 12 of the outer cage member. The cross members 16 are notched at their inner ends, as indicated at 17, to provide space for an annular spring and preferably carry dowels 18 at their ends to hold the end rings 15 against relative rotation.

The cage is adapted to receive a series of tiltable grippers 19 whose ends are curved about spaced centers so that they will engage and grip the races when the outer race tends to turn clockwise relative to the inner race, as seen in Figures 1 and 4 and to release the races when the outer race turns counter-clockwise relative to the inner race. Outer ends of the grippers extend through the spaces between adjacent cross bars 13 on the outer cage ring and their inner ends extend through the spaces between adjacent cross members 16 on the inner cage ring. Preferably, the grippers are resiliently urged toward engaging position by spring means shown as an annular coil spring 21 extending through openings in the grippers and lying loosely within the notches 14 and 17 of the cage rings.

The cage rings when mounted between the races provide smooth cylindrical inner and outer surfaces slidably to engage the inner and outer races so that during overrunning of the clutch, the races can slide freely over the cage surfaces which function as bearings. The interengaging surfaces of the cage rings are also smooth cylindrical surfaces so that the cage rings can turn freely relative to each other. Relative turning of the cage rings is limited by providing in the end rings 15 circumferentially elongated notches 22 which receive projections 23 secured to the end rings 12 of the outer cage. The length of the notches 22 is such that the cage rings can move relative to each other a sufficient distance to allow the grippers to tilt between their fully engaged and fully disengaged positions, but that the cage rings cannot move far enough relative to each other to cause or permit excessive tilting of the grippers in either direction.

The clutch, as shown in Figure 1, is in its disengaged or overrunning position in which the outer cage ring has moved to the maximum permissible extent counterclockwise relative to the inner cage ring and the grippers are tilted counter-clockwise to release the races. At this time, the outer ends of the grippers engage the cross bars 13 of the outer cage ring and the inner ends of the grippers engage the cross bars 16 of the inner cage ring. Further tilting of the grippers is therefore prevented and the grippers are held in their maximum released position. In this position of the grippers, the races can turn relative to each other on the inner and outer cylindrical surfaces of the cage rings and cross bars which function effectively as bearings to provide a relatively substantial bearing surface.

When the outer race turns clockwise relative to the inner race, the outer cage ring will tend to turn clockwise relative to the inner cage ring to the position shown in Figure 4. During this movement, the cross bars 13 of the outer cage ring will engage the grippers and tilt them clockwise while the cross bars 16 of the inner cage ring will engage the inner ends of the grippers also to tilt them clockwise. Thus the grippers will be uniformly and rapidly moving from their disengaged to their engaged position. When the direction of relative rotation again reverses the cage rings will act in the opposite direction of the grippers to move them uniformly and rapidly to their disengaged position.

To facilitate control of the grippers by the cross bars as described above, the cross bars 13 on the outer cage are made widest at their outer surfaces with rounded edges to engage the faces of the grippers. The sides of the cross bars taper inward at angles generally parallel to the sides of the grippers in the two extreme positions of the grippers. The cross bars 16 of the inner cage ring are similarly shaped to be wider at their inner surfaces with their sides tapering upward. Thus the cross bars will bear against the inner and outer ends of the grippers to tilt them effectively and will support the grippers against excessive tilting.

Due to the fact that one of the cage rings is made in two parts, the clutch and bearing of the present invention can readily be assembled and disassembled. For assembly, the grippers may first be connected to the annular spring and may then be inserted between the cross bars 13 of the outer cage ring. Thereafter, the inner cage ring members may be fitted axially together within the outer cage ring. Upon completion of this assembly, the projections 23, which may be in the form of detachable screws or the like, may be secured to the outer cage ring to hold the inner cage ring members against axial separation as well as to limit relative rotation between the cage rings.

While one embodiment of the invention has been shown and described in detail it will be understood that this is illustrative only and is not to be taken as a definition of the invention, reference being had for this purpose to the appended claims.

What is claimed is:

1. A combined one way clutch and bearing comprising inner and outer cylindrical races, an outer cage ring having annular end rings formed with cylindrical outer surfaces slidably engaging the outer race and cylindrical inner surfaces and axially extending spaced cross members between the end rings, an inner cage ring relatively arcuately movable with respect to said outer cage ring and including annular end rings having cylindrical outer surfaces slidably engaging the inner surfaces of the end rings on the outer cage and cylindrical inner surfaces slidably engaging the inner race and axially extending spaced cross members between the end rings, a series of tiltable grippers between the races with their inner and outer ends extending between the cross members of the inner and outer cages respectively, and lost motion stop means interconnecting the inner and outer cage rings to limit relative rotation thereof.

2. The construction of claim 1 in which the cross members of one cage ring rigidly connect the end rings and the end rings of the other cage ring are separate from each other.

3. A combined one way clutch and bearing comprising inner and outer cylindrical races, an outer cage ring having annular end rings formed with cylindrical outer surfaces slidably engaging the outer race and cylindrical inner surfaces and axially extending spaced cross members between the end rings, an inner cage ring relatively arcuately movable with respect to said outer cage ring and including annular end rings having cylindrical outer surfaces slidably engaging the inner surfaces of the end rings on the outer cage and cylindrical inner surfaces slidably engaging the inner race and axially extending spaced cross members between the end rings, the cross members on the cage rings being of the same thickness as the end rings throughout the major part of their length and having smooth cylindrical inner and outer surfaces slidably to engage each other and the races, and a series of tiltable grippers between the races with their inner and outer ends fitting between the cross members of the inner and outer cages respectively.

4. A combined one way clutch and bearing for use between inner and outer cylindrical races comprising relatively arcuately movable inner and outer cage rings formed with cylindrical inner and outer surfaces slidably engaging each other and the races respectively, one of the cage rings including a pair of separate annular end rings each having integral spaced teeth projecting therefrom and abutting end to end to define cross members, a series of tiltable grippers between the races with their ends fitting between the cross members of the inner and outer cage rings, and parts carried by the end rings of said one of the cage rings and overlying the end rings of said other cage ring to prevent axial separation of the last named end rings.

5. A combined one way clutch and bearing for use between inner and outer cylindrical races comprising relatively arcuately movable inner and outer cage rings formed with cylindrical inner and outer surfaces slidably engaging each other and the races respectively, one of the cage rings including annular end rings connected by integral spaced cross members, the other cage ring including a pair of separate annular end rings each having integral spaced teeth projecting therefrom and abutting end to end to define cross members, a series of tiltable grippers between the races with their ends fitting between the cross members of the inner and outer cage rings, the last named end rings being formed with elongated recesses in their outer ends, and parts projecting from the first named end rings loosely into the recesses to limit relative rotation of the cage rings and axial separation of the last named end rings.

6. A combined one-way clutch and bearing comprising a pair of races together providing a pair of annular radially spaced surfaces, first generally annular means having an annular surface in engagement with an annular surface of the outer race, second generally annular means relatively arcuately movable with respect to said first annular means having an inner annular surface in engagement with an annular surface of the inner race, a plurality of grippers tiltable normally through a range including an engaged position in which said race members are wedgingly coupled together for unitary rotation and a disengaged position in which said race members are rotatable relative to each other, resilient means adapted to bias said grippers, and a pair of interengaging lost motion means respectively on said first and second annular means to limit the degree of tilt of said grippers beyond said disengaged position.

7. The device defined in claim 6 in which said means to limit the degree of tilt of said grippers includes means fixed to one of said annular means and a slot in the other of said annular means.

8. The device defined in claim 6 in which said means to limit the degree of tilt of said grippers comprise means fixed to said first generally annular means and slot defining means in said second generally annular means.

9. A combined one-way clutch and bearing comprising inner and outer cylindrical races, an outer cage ring having annular end rings formed with cylindrical outer surfaces slidably engaging the outer race and cylindrical inner surfaces and axially extending spaced cross members between the end rings, an inner cage ring relatively arcuately movable with respect to said outer cage ring and including annular end rings having cylindrical outer surfaces slidably engaging the inner surfaces of the end rings on the outer cage and cylindrical inner surfaces slidably engaging the inner race and axially extending spaced cross members between the end rings, a series of tiltable grippers between the races with their inner and outer ends extending between the cross members of the inner and outer cages respectively, the cross members of one cage ring being rigidly connected to the end rings thereof and the end rings of the other cage ring being separate from each other, the cross members of said other cage ring abutting and being formed with interengaging parts to prevent relative circumferential movement thereof.

References Cited in the file of this patent
UNITED STATES PATENTS

| | | |
|---|---|---|
| 2,366,842 | Dodge et al. | Jan. 9, 1945 |
| 2,486,603 | King | Nov. 1, 1949 |
| 2,724,472 | Swenson | Nov. 22, 1955 |